US012788042B2

(12) United States Patent
Dedieu

(10) Patent No.: US 12,788,042 B2
(45) Date of Patent: Nov. 10, 2026

(54) USE OF AMYLOSE-RICH PRE-GELATINIZED STARCH HAVING A LARGE PARTICLE SIZE AS A TEXTURING AGENT PROVIDING PASTY FOOD COMPOSITIONS WITH A PULPY CHARACTER

(71) Applicant: ROQUETTE FRERES, Lestrem (FR)

(72) Inventor: Géraldine Dedieu, Bruz (FR)

(73) Assignee: Roquette Freres, Lestrem (FR)

( * ) Notice: Subject to any disclaimer, the term of this patent is extended or adjusted under 35 U.S.C. 154(b) by 720 days.

(21) Appl. No.: 17/907,502

(22) PCT Filed: Mar. 29, 2021

(86) PCT No.: PCT/FR2021/050552
§ 371 (c)(1),
(2) Date: Sep. 27, 2022

(87) PCT Pub. No.: WO2021/198607
PCT Pub. Date: Oct. 7, 2021

(65) Prior Publication Data

US 2023/0069481 A1 Mar. 2, 2023

(30) Foreign Application Priority Data

Mar. 30, 2020 (FR) ..................................... 20 03156

(51) Int. Cl.

| | |
|---|---|
| ***A23L 29/212*** | (2016.01) |
| ***A23L 5/10*** | (2016.01) |
| ***A23L 11/00*** | (2025.01) |
| ***A23L 19/00*** | (2016.01) |
| ***A23L 23/00*** | (2016.01) |

(52) U.S. Cl.
CPC ............... *A23L 29/212* (2016.08); *A23L 5/10* (2016.08); *A23L 11/05* (2016.08); *A23L 19/09* (2016.08); *A23L 23/00* (2016.08); *A23V 2002/00* (2013.01)

(58) Field of Classification Search
CPC ........ A23L 29/212; A23L 19/09; A23L 11/05; A23L 5/10; A23L 23/00
See application file for complete search history.

(56) References Cited

U.S. PATENT DOCUMENTS 3,650,770 A * 3/1972 Marotta .................. A23G 3/42 426/589
4,810,517 A * 3/1989 Glittenberg ............. A23L 23/00 426/810
5,281,432 A * 1/1994 Zallie ..................... A21D 13/26 426/549
(Continued)

FOREIGN PATENT DOCUMENTS

CA 978021 A 11/1975
EP 0026102 A1 4/1981
(Continued)

OTHER PUBLICATIONS

The English translation of the Colombia Office Action, mailed on Oct. 14, 2025, in the corresponding Colombia Appl. No. NC2022/0014204.

*Primary Examiner* — Stephanie A Kohler

(57) ABSTRACT

The invention relates to the use of amylose-rich pre-gelatinized starch having a large particle size as a texturing agent providing pasty food compositions with a pulpy texture.

3 Claims, 7 Drawing Sheets

(56) References Cited

U.S. PATENT DOCUMENTS

| | | | | |
|---|---|---|---|---|
| 5,362,777 | A | 11/1994 | Tomka | |
| 5,759,581 | A | 6/1998 | Baensch et al. | |
| 6,720,019 | B2 | 4/2004 | Mikla et al. | |
| 7,118,764 | B2 * | 10/2006 | Carbone | A23L 27/79<br>34/372 |
| 9,963,581 | B2 | 5/2018 | Ichihara et al. | |
| 11,084,887 | B2 | 8/2021 | Fonteyn | |
| 2008/0220147 | A1 | 9/2008 | Barrera Rivera et al. | |
| 2010/0330369 | A1 * | 12/2010 | Veelaert | A61Q 1/10<br>427/212 |
| 2021/0051965 | A1 * | 2/2021 | Bahammou | C08B 30/14 |
| 2022/0007697 | A1 | 1/2022 | Kubota et al. | |

FOREIGN PATENT DOCUMENTS

| | | | |
|---|---|---|---|
| EP | 0240313 | A1 | 10/1987 |
| EP | 1051917 | A2 | 11/2000 |
| EP | 1179298 | A2 | 2/2002 |
| FR | 1519441 | A | 3/1968 |
| WO | 9322938 | A1 | 11/1993 |
| WO | 2004108767 | A2 | 12/2004 |
| WO | 2011124656 | A1 | 10/2011 |
| WO | 2018033679 | A1 | 2/2018 |

* cited by examiner

[Fig. 1]
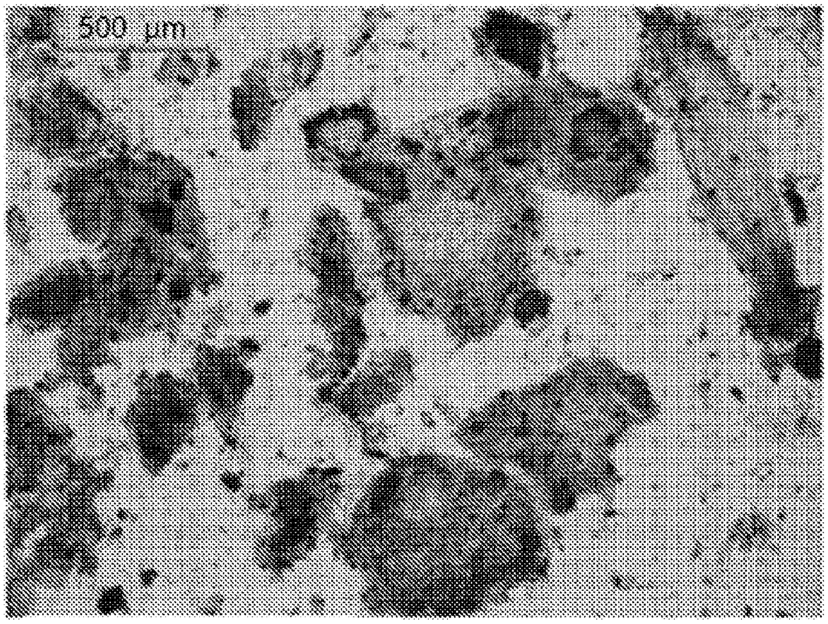
[Fig. 2]
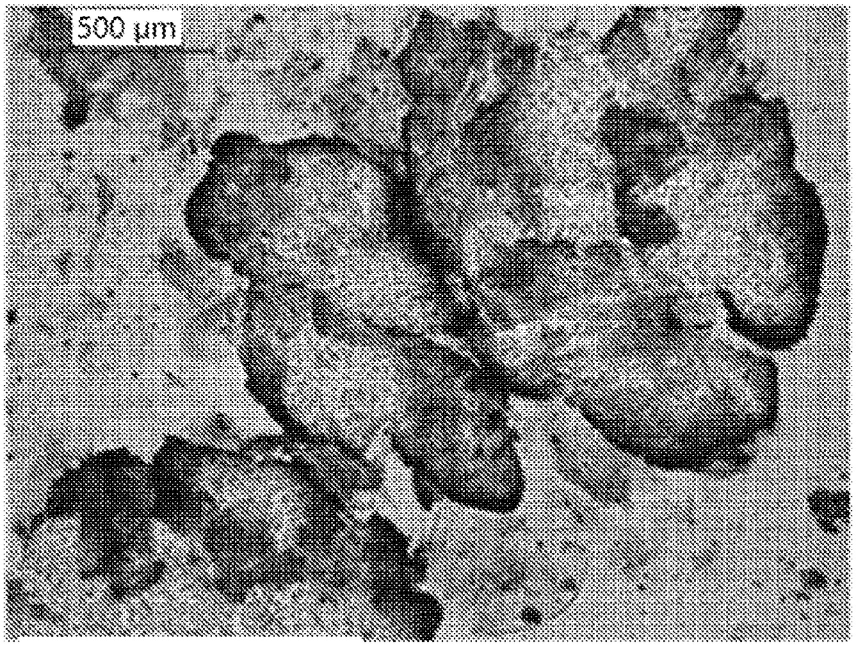

[Fig. 3]
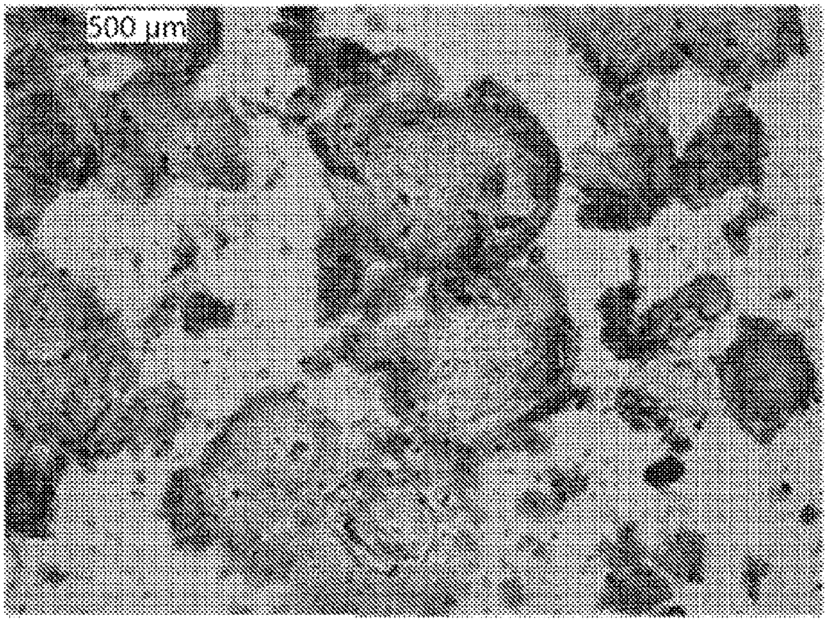
[Fig. 4]
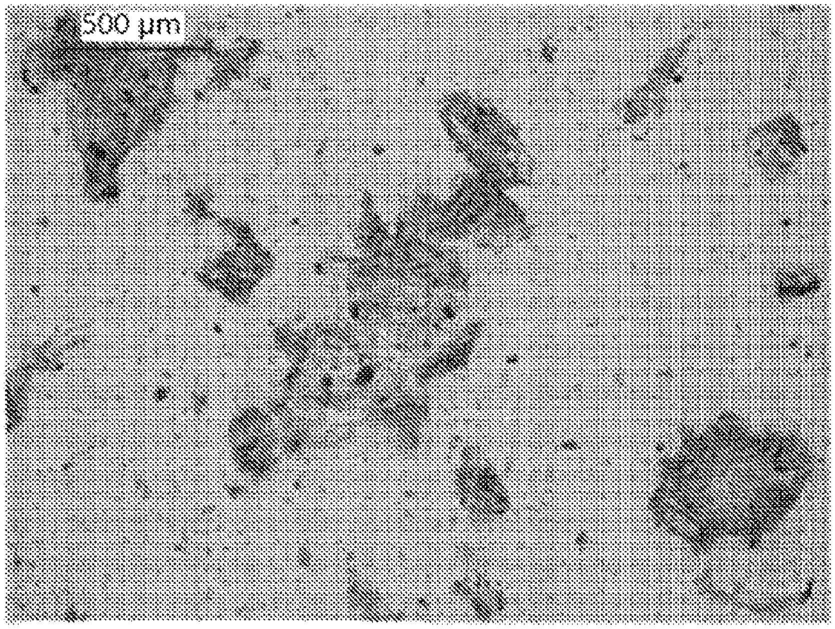

[Fig. 5]
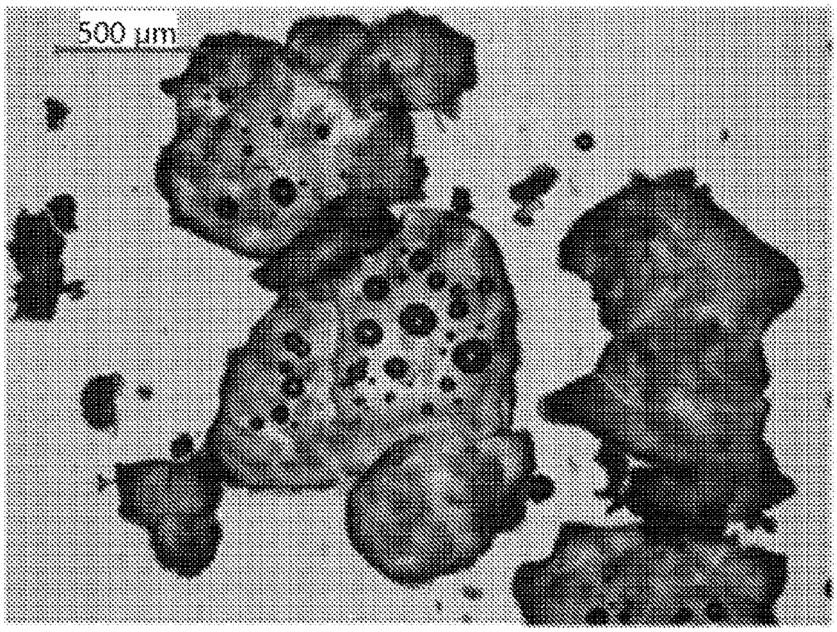
[Fig. 6]
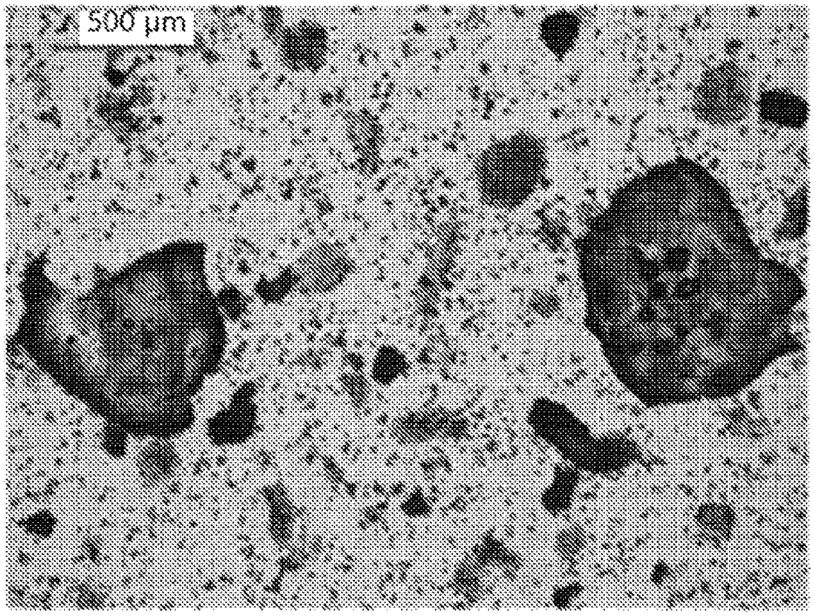

[Fig. 8]
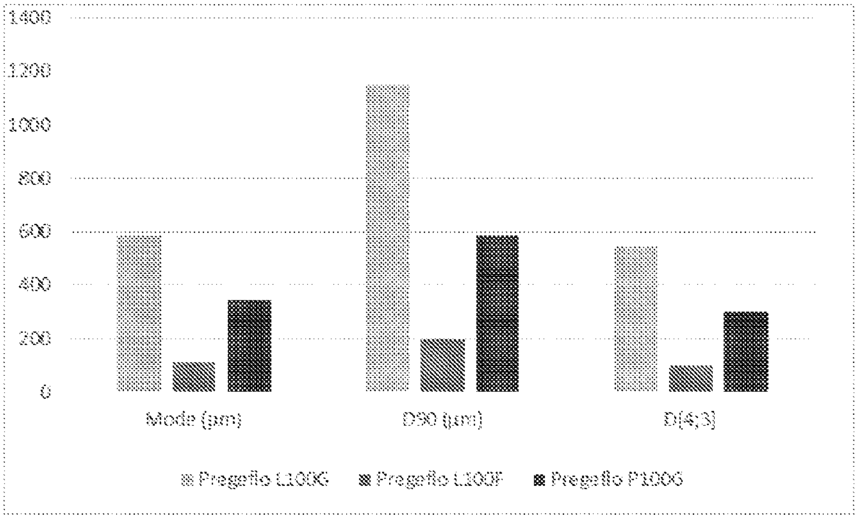
[Fig. 9]
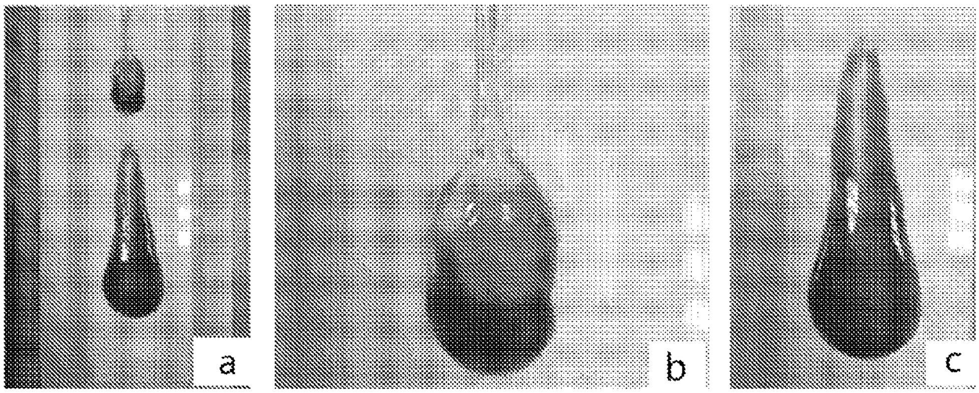

[Fig. 10]
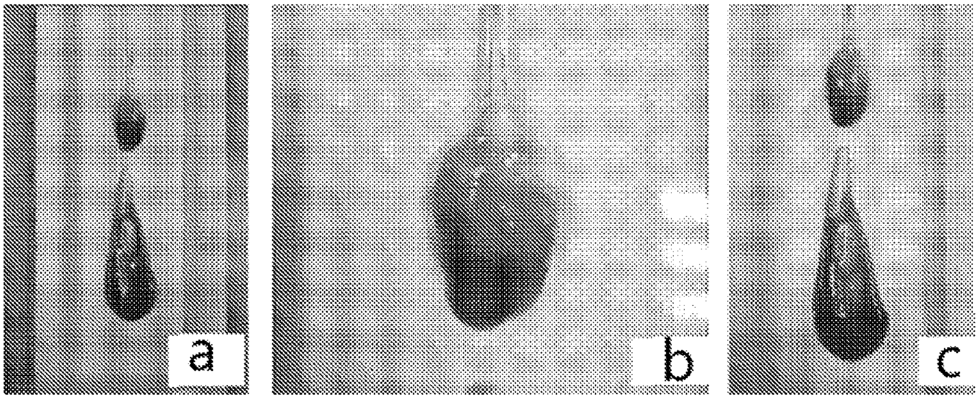
[Fig. 11]
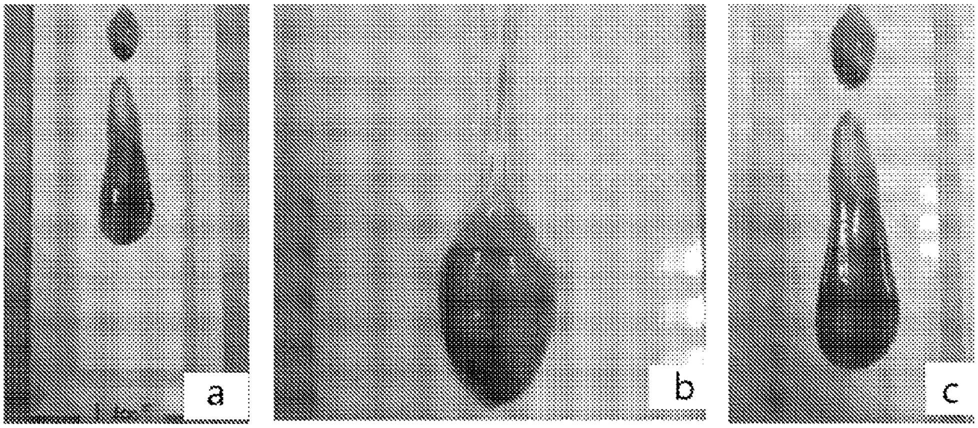

[Fig. 12]
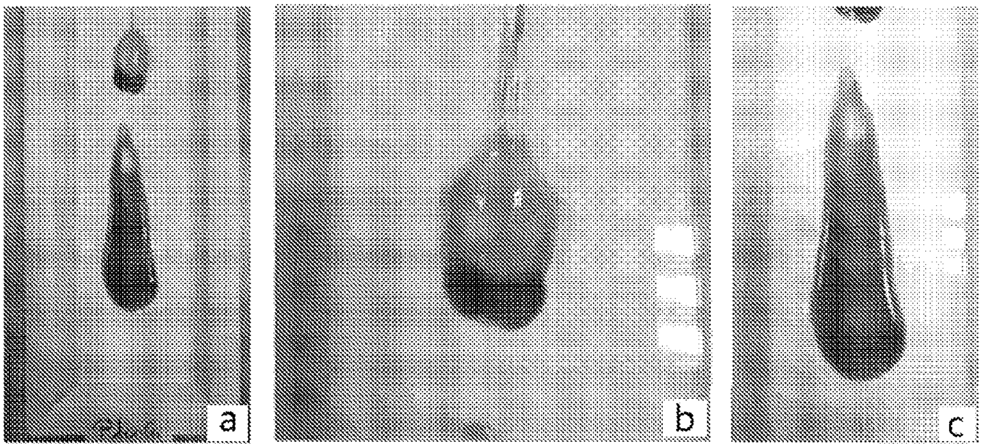
[Fig. 13]
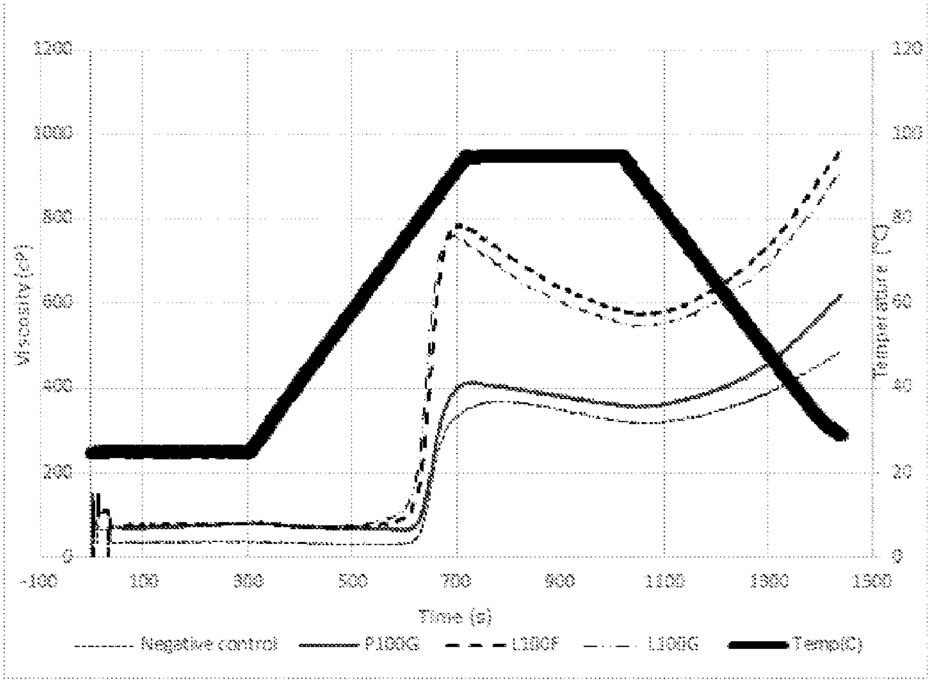

USE OF AMYLOSE-RICH PRE-GELATINIZED STARCH HAVING A LARGE PARTICLE SIZE AS A TEXTURING AGENT PROVIDING PASTY FOOD COMPOSITIONS WITH A PULPY CHARACTER

TECHNICAL FIELD

The present invention relates to the use of an amylose-rich pre-gelatinized starch having a large particle size as a texturizing agent providing pasty food compositions with a pulpy character, especially tomato sauce to be reconstituted, so-called "instant".

The present invention also relates to a method for preparing pasty food products notable in that between 12 to 18%, preferably of the order of 15%, by weight of the total weight of the food composition is replaced by amylose-rich pre-gelatinized starch having a large particle size.

The invention also relates to a tomato sauce composition wherein between 12 to 18%, preferably of the order of 15%, by weight of the total weight of the composition is replaced by amylose-rich pre-gelatinized starch having a large particle size.

The invention also relates to a method for preparing a dry food composition as well as said dry composition to be reconstituted.

PRIOR ART

For a food composition, the "pulpy" or "granular" organoleptic characteristics are a sensory characterization of the texture mainly related to the presence of coarsely structured particles.

The pulpy and granular textures thus contrast with creamy or smooth textures.

As an ingredient of said food compositions, in addition to proteins, lipids and various saccharides, starch is one of the most important texturizing agents used.

Among the properties of starch for this texturizing agent functionality are its ability:

- to bind with an amount of water useful for its controlled release and/or retention in said pasty food composition,
- to modify the rheology of said compositions by the formation of a three-dimensional network and
- often in synergy with other ingredients or texturing agents, to ensure a better stability of said compositions, which leads to obtaining a wide variety of textures, ranging from "soft" solid to gel-like structures.

The texture obtained also contributes decisively to improving the taste of the food composition containing some of it.

The use of various starches and their derivatives, in the commercial and industrial manufacturing of food compositions, is common practice.

By using native and/or modified starch, the sensory and physical properties of the food products are decisively influenced, which makes it possible to adjust the quality of the products almost on demand.

Synthesized biochemically, a source of carbohydrates, starch is one of the most widespread organic materials in the plant kingdom, where it constitutes organisms' nutrient reserves.

It is thus naturally present in the reserve organs and tissues of higher plants, in particular in cereal grains (wheat, corn, etc.), legume grains (peas, beans, etc.), potato or cassava tubers, roots, bulbs, stems and fruit.

Starch is a mixture of two homopolymers, amylose and amylopectin, composed of D-glucose units bonded to one another via α-(1-4) and α-(1-6) linkages which are the source of branching in the structure of the molecule. These two homopolymers differ in terms of the degree of branching thereof, and the degree of polymerization thereof.

Amylose, slightly branched with short branches, has a molecular weight that can be comprised between 10,000 and 1,000,000 Dalton. The molecule is formed of 600 to 1,000 glucose molecules.

Amylopectin is a branched molecule with long branches every 24 to 30 glucose units via α (1-6) linkages. The molecular weight thereof may range from 1,000,000 to 100,000,000 Dalton, and the degree of branching thereof is approximately 5%. The total chain can be between 10,000 and 100,000 glucose units.

The ratio of amylose to amylopectin depends on the botanical source of the starch.

Starch is stored in reserve organs and tissues in a granular state, that is in the form of semi-crystalline granules.

This semi-crystalline state is substantially due to the presence of amylopectin macromolecules.

In the native state, the starch grains have a rate of crystallinity that varies from 15 to 45% and that substantially depends on the botanical origin and any treatment that it has undergone.

Granular starch placed under polarized light thus has, in microscopy, a characteristic black cross referred to as "Maltese cross".

This phenomenon of positive birefringence is due to the semi-crystalline organization of these granules: the average orientation of the polymer chains being radial.

For a more detailed description of granular starch, reference may be made to chapter II, entitled "Structure et morphologie du grain d'amidon" ["*Structure and morphology of the starch grain*"] by S. Perez, in the work "Initiation à la chimie et à la physico-chimie macromoléculaires" ["*Introduction to macromolecule chemistry and physical chemistry*"], first edition, 2000, volume 13, pages 41 to 86, Groupe Francais d'Etudes et d'Applications des Polymères [French Polymer Group].

Dry starch contains a water content which ranges from 12 to 20%, depending on the botanical origin. This water content obviously depends on the residual moisture of the medium (for an aw=1, the starch may fix up to 0.5 g of water per gram of starch).

Heating, with an excess of water, a starch suspension to temperatures close to its gelatinization temperature leads to irreversible swelling of the grains and leads to the dispersion thereof, then the dissolution thereof.

It is these properties in particular which give starch its technological properties of interest.

For a given temperature range, referred to as "gelatinization range", the starch grain will very quickly swell and lose its semi-crystalline structure (loss of birefringence).

All the grains will be swollen to the maximum over a temperature range of the order of 5 to 10° C. A paste is obtained composed of swollen grains that constitute the dispersed phase and dispersed molecules (corresponding mainly to amylose) that thicken the aqueous continuous phase.

The rheological properties of the paste depend on the relative proportion of these two phases, dispersed and aqueous, and on the swelling volume of the grains. The gelatinization range is variable depending on the botanical origin of the starch.

The maximum viscosity is obtained when the starch paste contains a large number of highly swollen grains. When heating is continued, the grains will burst and the material will disperse in the medium. However, solubilization will only occur when temperatures are above 100° C.

Amylose-lipid complexes have delayed swelling because the combination prevents the interaction of the amylose with the water molecules, and temperatures of greater than 90° C. are necessary in order to obtain the total swelling of the grains (amylomaize being complexed to the lipids).

The disappearance of the grains and the dissolution of the macromolecules leads to a reduction in the viscosity.

Lowering the temperature (by cooling) of the starch paste causes an insolubilization of the macromolecules and a separation of the phases due to the incompatibility between amylose and amylopectin, then a crystallization of these macromolecules is observed.

This phenomenon is known by the name retrogradation.

When a paste contains amylose, it is this first molecule which will undergo retrogradation.

It will consist in the formation of a double helix and the combination of the latter to form "crystals" (type B) which will give rise to a three-dimensional network via junction zones.

This network is formed very quickly, in a few hours. During the development of this network, the association of the double helices with one another via hydrogen bonds displaces the water molecules associated with the helices and causes significant syneresis.

As a general rule, common starches and starch derivatives, due to their processing method, tend to form creamy or smooth textures.

For example, in the international patent application WO 1993/22938, starch-thickened food compositions with improved freeze-thaw stability and a "good" texture, in this case "smooth", are described.

The starch is a mixture of gelatinized native starch and amylopectin and the process involves cooking and shearing the amylopectin component of said mixture separately.

This mixture whose amylopectin component is sheared, that is, mechanically degraded, can only bring a thickening effect, and in no case confer a pulpy effect.

To remedy this, the use of native starches rich in intact amylopectin to provide certain food compositions with pulpy or granular textures is proposed.

Thus, in the international patent application WO 2000/32061, a method is proposed wherein an amylopectin-rich potato starch is added to a food composition in an amount effective to bring about the desired organoleptic change in the treated food—amylopectin-rich being understood in this application to mean an amylopectin concentration greater than 95% or even greater than 98%.

According to these authors, only this quality of starch rich in amylopectin makes it possible to reinforce, and even stabilize, the pulpy side of the food composition.

However, it is also mentioned that conventional treatments for the preparation of food compositions can lead to disruption of the "supramolecular" structure of the starch and must therefore be expressly avoided.

To remedy this, the inventors found that instead of amylopectin-rich starch, it was more sensible to use amylose-rich starch, and not in its native form, but in pre-gelatinized form.

GENERAL DESCRIPTION OF THE INVENTION

The present invention relates to the use of an amylose-rich pre-gelatinized starch having a large particle size, as a texturizing agent providing pasty food compositions with a pulpy character, especially tomato sauce to be reconstituted, so-called "instant".

Thus, the present invention relates to the use of an amylose-rich pre-gelatinized starch having a large particle size as a texturizing agent providing pasty food compositions with a pulpy character, the amylose content of which is greater than 25% by weight relative to the total weight of starch and the particle size of which, determined according to the German standard DIN 66145:1976-04, is defined by an "n" value greater than 1.7 and a "d" value greater than 850 μm.

Preferably, the amylose-rich starch is derived from leguminous plants, specifically peas or faba beans.

Thus, the amylose content of the starch is comprised between 25% and 45%, preferably of the order of 35% by total weight of starch.

Preferably, the pre-gelatinized starch is native.

Even more preferably, the size of the starch particles, determined according to the German standard DIN 66145:1976-04, has an "n" value comprised between 1.7 and 2, preferably of the order of 1.8 and a "d" value comprised between 850 and 1,000 μm, preferably of the order of 900 μm.

The amylose-rich pre-gelatinized starch having a large particle size implemented according to the invention is then introduced into the recipe for pasty food compositions, so as to substitute from 12 to 18%, preferably of the order of 15% by weight of the total weight of the total constituents of said recipe. In other words, the dry food composition prepared by this method comprises 12 to 18% by weight of the amylose-rich pregelatinized starch having a large particle size.

According to another aspect, the invention relates to a method for preparing a dry food composition, especially a tomato sauce to be reconstituted, the method comprising the replacement of an amount of 12 to 18% by weight with amylose-rich pre-gelatinized starch having a large particle size, preferably of the order of 15% by weight, relative to the total weight of the constituents of said composition, the amylose content of which is greater than 25% by weight relative to the total weight of starch, and the particle size of which, determined according to the German standard DIN 66145:1976-04, is defined by an "n" value greater than 1.7 and a "d" value greater than 850 μm.

The dry food composition according to the invention is useful in the preparation of pasty food products, especially "instant" tomato sauce, that is, a tomato sauce reconstituted from a dry composition. Indeed, it makes it possible to replace between 12 to 18%, preferably of the order of 15% by weight of the total weight of the dry food product, with amylose-rich pre-gelatinized starch having a large particle size.

Thus, the invention relates to a method for preparing a pasty food composition, the method comprising the following steps:

- providing a dry food composition comprising an amount of 12 to 18% by weight of amylose-rich pre-gelatinized starch having a large particle size, preferably of the order of 15% by weight, relative to the total weight of the constituents of said composition;
- providing an effective amount of water;
- homogenizing the mixture thus obtained between the dry composition and the water;
- cooking said mixture in order to obtain said pasty food composition, the pre-gelatinized starch having an amylose content greater than 25% by weight relative to the total weight of starch and a particle size determined according to the German standard DIN 66145:1976-04 and defined by an "n" value greater than 1.7 and a "d" value greater than 850 μm.

Preferably, the amylose-rich starch is derived from leguminous plants, specifically peas or faba beans.

Thus, the amylose content of the starch is comprised between 25% and 45%, preferably of the order of 35% by total weight of starch.

Preferably, the pre-gelatinized starch is native.

Even more preferably, the size of the starch particles, determined according to the German standard DIN 66145: 1976-04, has an "n" value comprised between 1.7 and 2, preferably of the order of 1.8 and a "d" value comprised between 850 and 1,000 μm, preferably of the order of 900 μm.

According to another aspect, the invention relates to a pasty food composition obtained by a preparation method according to the previous aspect. Preferably, the composition is a reconstituted tomato sauce, so-called "instant".

The invention also relates to a dry food composition intended to be reconstituted to form a pasty food composition, said dry composition comprises an amount of from 12 to 18% by weight of amylose-rich pre-gelatinized starch having a large particle size, preferably of the order of 15% by weight, relative to the total weight of the constituents of said dry composition, the amylose content of which is greater than 25% by weight relative to the total weight of starch, and the particle size of which, determined according to the German standard DIN 66145:1976-04, is defined by an "n" value greater than 1.7 and a "d" value greater than 850 μm.

Preferably, said dry food composition is a tomato sauce to be reconstituted.

DESCRIPTION OF THE FIGURES

FIG. 1 shows a picture of a dry food composition comprising PREGEFLO® L100 F; the magnification of the image is 35.

FIG. 2 shows a picture of a dry food composition comprising PREGEFLO® L100 G; the magnification of the image is 35.

FIG. 3 shows a picture of a dry food composition comprising PREGEFLO® P100 G; the magnification of the image is 35.

FIG. 4 shows a picture of a control dry food composition not comprising PREGEFLO® corresponding to the negative control; the magnification of the image is 35.

FIG. 5 shows a picture of an aqueous composition comprising PREGEFLO® P100 Gin water; the magnification of the image is 35.

FIG. 6 shows a picture of a food composition comprising PREGEFLO® P100 G to be reconstituted taken before the cooking step; the magnification of the image is 35.

FIG. 8 shows three graphs corresponding to the particle size distributions in view of the diameters of type Dmode, D90 and D(4;3), respectively in relation to the compositions comprising PREGEFLO® L100 F, PREGEFLO® L100 G or PREGEFLO® P100 G.

FIG. 9 shows three pictures (a, b, c) of a reconstituted control pasty food composition not comprising PREGEFLO®; pictures b and c correspond to enlarged pictures of the elements shown in picture a.

FIG. 10 shows three pictures (a, b, c) of a reconstituted control pasty food composition comprising PREGEFLO® L100 G; pictures b and c are enlarged pictures of the elements shown in picture a.

FIG. 11 shows three pictures (a, b, c) of a reconstituted control pasty food composition comprising PREGEFLO® L100 F; pictures b and c correspond to enlarged pictures of the elements shown in picture a.

FIG. 12 shows three pictures (a, b, c) of a reconstituted control pasty food composition comprising PREGEFLO® P100 G; pictures b and c are enlarged pictures of the elements shown in picture a.

FIG. 13 shows a picture corresponding to the results of viscosity measurements of pasty food compositions corresponding to a negative control composition not comprising PREGEFLO® or to compositions comprising PREGEFLO® L100 F, PREGEFLO® L100 G or PREGEFLO® P100 G, respectively.

DETAILED DESCRIPTION OF THE INVENTION

Figure 7:
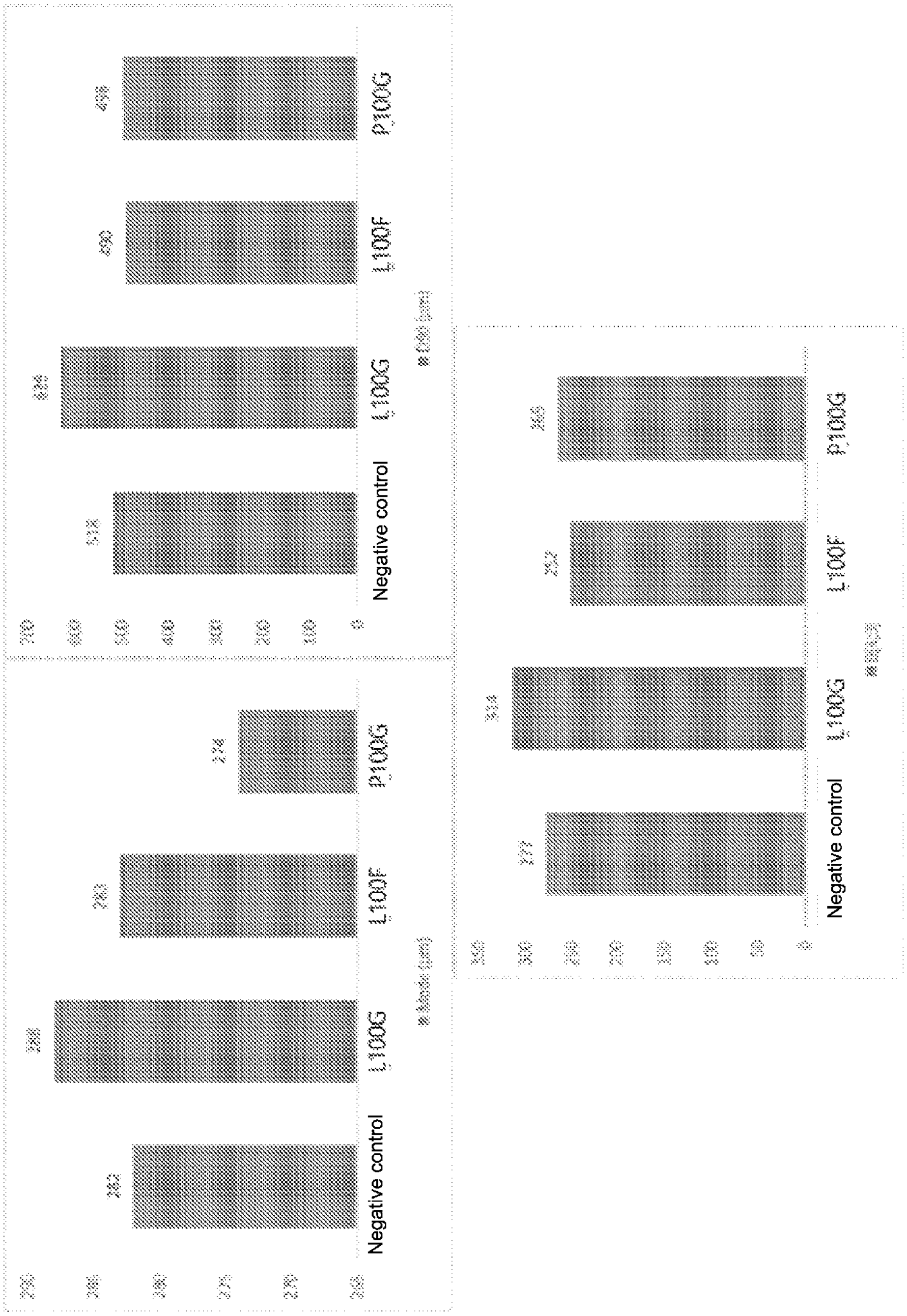
FIG. 7 shows three graphs corresponding to the results of the measurements of the diameters of type Dmode, D90 and D(4;3), respectively with respect to a negative control or to compositions comprising PREGEFLO® L100 F, PREGEFLO® L100 G or PREGEFLO® P100 G.

The present invention therefore relates to the use of pre-gelatinized amylose-rich starches having a large particle size as a texturizing agent providing pasty food compositions with a pulpy character, especially tomato sauce to be reconstituted, known as "instant".

They will be more preferentially selected herein varieties naturally rich in amylose extracted from leguminous plants such as the pea and faba bean.

"Pasty composition" is understood as a wet intermediate composition, neither totally solid nor totally liquid in consistency, but rather soft and flexible. In the present invention, relating to tomato sauce, said pasty food composition will have the consistency known by everybody.

The term "pea" being considered herein in its broadest sense and including in particular:

- all wild varieties of "smooth peas", and
- all mutant varieties of "smooth peas" and "wrinkled peas", regardless of the uses for which the varieties are generally intended (human food, animal feed and/or other uses).

Said mutant varieties are in particular those named "mutants r", "mutants rb", "mutants rug 3", "mutants rug 4", "mutants rug 5" and "mutants lam" as described in the article by C-L HEYDLEY et al. entitled "Developing novel pea starches", Proceedings of the Symposium of the Industrial Biochemistry and Biotechnology Group of the Biochemical Society, 1996, "Faba bean" is understood as the group of annual plants of the species Vicia faba, belonging to the group of leguminous plants of the family Fabaceae, subfamily Faboideae, and tribe Fabeae. A distinction is made between Minor and Major varieties. In the present invention, wild-type varieties and those obtained by genetic engineering or varietal selection are all excellent sources.

"Amylose-rich" starch is understood as a starch having an amylose content of 25% to 45%, of the order of 35% by weight, relative to the total weight of pea starch.

"Starch" is understood as any composition extracted, in any way whatsoever, from peas or faba beans, and whose starch content is greater than 40%, preferably greater than 50% and even more preferentially greater than 75%, these percentages being expressed in dry weight with respect to the dry weight of said composition.

Advantageously, this starch content is greater than 90% (dry/dry). It may in particular be greater than 95%, including greater than 98%.

"Pre-gelatinized" or "pre-gel" starch is understood as a starch that has been cooked and then dried in a starch factory on a drying drum or in an extruder, rendering the starch soluble in cold water.

The pre-gelatinization of starch is an operation well known to the skilled person wherein cooking is carried out at a temperature below the gelatinization temperature of the starch.

Starch "having a large particle size" is understood as a starch containing a particle size determined according to the German standard DIN 66145 dated April 1976 (DIN 66145:1976-04), at an "n" value comprised between 1.7 and 2, preferably of the order of 1.8, and a "d" value comprised between 850 and 1,000 μm, preferably of the order of 900 μm.

In the present invention, pre-gelatinized pea starch having a large particle size is introduced as a mixture, in powder form, with the various ingredients of the food composition under consideration, in this case an "instant" tomato sauce.

As exemplified below, the introduction in the recipe is carried out by substituting a part of the tomato powder, from 30 to 35% by weight.

This leads to the introduction of the pre-gelatinized pea starch having a large particle size implemented according to the invention in the "instant" tomato sauce recipe, so as to substitute from 12 to 18%, preferably of the order of 15% by weight of the total weight of the components of said recipe.

The contribution of such a pre-gelatinized starch is estimated in comparison with that of a pre-gelatinized pea starch of finer particle size, or a pre-gelatinized starch of the same particle size but of different botanical origin, in this case pre-gelatinized potato starch.

The invention will be better understood with the aid of the following example, which is intended to be illustrative and non-limiting.

EXAMPLE

Presentation of the Pre-Gelatinized Starches Tested

Pre-gelatinized starches can be obtained by hydrothermal gelatinization of native starches, especially by steam cooking, jet-cooking, drum cooking or kneading cooking.

Such starches generally have a solubility in deionized water at 20° C. greater than 5% by weight and more typically comprised between 10% and 100%, and a degree of starch crystallinity less than 15% (in A_RX diffraction intensity), typically less than 5%, and most commonly less than 1%, or even zero.

To measure the solubility: place in a 200 ml beaker, 5 g of product in 100 ml of distilled water. Stir, at room temperature, for 15 minutes. Centrifuge for 10 minutes at 4,000 rpm. In the absence of deposition, there is total solubility.

The degree of crystallinity is measured by X-ray diffraction, as described in U.S. Pat. No. 5,362,777 (column 9, lines 8 to 24).

As an example, the products manufactured and marketed by the Applicant under the PREGEFLO® trademark can be cited, and more particularly as used in the present example:

- PREGEFLO® L100 G, prepared from native pea starch of large particle size; i.e. having, according to the German standard DIN 66145:1976-04, an "n" value comprised between 1.6 and 2, preferentially of the order of 1.8 and a "d" value comprised between 900 and 1,000 μm, preferentially of the order of 900 μm. The amylose content is of the order of 35%.
- PREGEFLO® L100 F, prepared from native pea starch of large particle size, obtained by grinding PREGEFLO® L100G in such a way as to present, according to the German standard DIN 66145:1976-04, an "n" value comprised between 1.2 and 1.8, and a "d" value comprised between 100 and 120 μm. The amylose content is of the order of 35%.
- PREGEFLO® P100 G, prepared from native potato starch, of the same particle size as PREGEFLO® L100 G used in the present invention. The amylose content is of the order of 21%.

Materials and Methods

Particle Size Measurement in the Cooked Tomato Sauce Composition

The equipment utilized is MALVERN, Mastersizer 3000.

The laser diffraction technique (according to Mie's theory) is used to measure the particle size distributions of the powders or wet colloidal dispersions based on these powders. The product is dispersed in the osmosed water of the particle size analyzer bowl and stirred at 1,900 rpm.

Method:

Darkening between 5 and 10%

Optical model=1.5 +0.01 i

In order to measure the particle size, three repetitions are performed.

The arithmetic mean of the three values is calculated based on the data obtained. This mean is retained.

Choice of points:

Dmode is the diameter of the main population (max peak value).

D90 is a diameter where the particle represents 90% of the total.

D (4.3) is the arithmetic mean of the distribution.

Visual aspect of the powdered or reconstituted sauce

A visual analysis is performed on each step of the sauce manufacturing, for each starch-based ingredient tested, on the dry powder composition before reconstitution and finally on the reconstituted composition. A score of 0 to 3 is assigned to evaluate the granularity/pulpiness (from least to most). Thus score 0 corresponds to a character that is not granular/pulpy; score 1 corresponds to a slightly granular/pulpy character; score 2 corresponds to a medium granular/pulpy character and score 3 corresponds to a very granular/pulpy character.

Viscosity measurement RVA (Rapid Visco Analyser)

Reference: PATTERN, rapid viscosity analyzer, RVA 4500

Program

TABLE 1

| Time (hh:mm:ss) | Parameter | Value |
|---|---|---|
| 00:00:00 | Temperature | 25° C. |
| 00:00:00 | Speed | 160 rpm |
| 00:00:10 | Speed | 500 |
| 00:00:30 | Speed | 160 |
| 00:05:00 | Temperature | 25° C. |
| 00:12:00 | Temperature | 95° C. |
| 00:17:00 | Temperature | 95° C. |
| 00:24:00 | Temperature | 25° C. |
| 00:24:00 | End | |

Microscopy

The pictures were obtained with a LEICA equipment with the following characteristics:

Light: white

Objective: ×20

Magnification: ×150

The sauce sample is dispersed in demineralized water, then stained with Lugol to highlight the starch granules. Lugol is a 1% aqueous iodine-based solution. The iodine reacts with amylose and forms complexes of spiral structure.

A blue/purple color is obtained if the starch comprises at least 20% by weight of amylose. Otherwise, the color of the starch granules remains brown/yellow.

The analysis must be carried out within 48 hours of reconstitution of the dry composition.

Formulation

The recipes of the dry compositions, called "dry mix" and reconstituted compositions, called "sauce" implemented are presented in the following Table 2.

TABLE 2

| Ingredients % by weight | Negative Control % | PREGEFLO ® L100G % | PREGEFLO ® L100F % | PREGEFLO ® P100G % |
|---|---|---|---|---|
| | | DRY MIX | | |
| Tomato powder | 61.92 | 46.92 | 46.92 | 46.92 |
| PREGEFLO ® L100G | | 15.00 | | |
| PREGEFLO ® L100F | | | 15.00 | |
| PREGEFLO ® P100G | | | | 15.00 |
| Waxy corn starch N-200 (ROQUETTE) | 12.00 | 12.00 | 12.00 | 12.00 |
| Sucrose | 14.00 | 14.00 | 14.00 | 14.00 |
| Salt | 3.10 | 3.10 | 3.10 | 3.10 |
| Sunflower oil | 2.00 | 2.00 | 2.00 | 2.00 |
| GLUCIDEX ® IT 21 (ROQUETTE) | 6.48 | 6.38 | 6.38 | 6.38 |
| Citric acid, anhydrous | 0.60 | 0.60 | 0.60 | 0.60 |
| Total | 100.00 | 100.00 | 100.00 | 100.00 |
| | | SAUCE | | |
| Dry mix without PREGEFLO ® | 14.80 | | | |
| Dry mix with PREGEFLO ® L100G | | 14.80 | | |
| Dry mix with PREGEFLO ® L100F | | | 14.80 | |
| Dry mix with PREGEFLO ® P100G | | | | 14.80 |
| Water | 85.20 | 85.20 | 85.20 | 85.20 |
| Total | 100.00 | 100.00 | 100.00 | 100.00 |

Cooking method

For standardization purposes and to monitor the evolution of the viscosity, the cooking of the sauce is carried out in the RVA. The skilled person will choose a temperature below the gelatinization temperature of the starch.

4.1 g of the powder mix is reconstituted in 23.9 g of water. Homogenization is carried out with a spoon before starting the program.

Results

Microscopy—State of the starch/Size of the granules

The results are presented in FIGS. 1 to 6.

Large granules were observed in the sauce with PREGEFLO® L100G; this is also the largest of the granules compared to the other tests.

In the sauce containing PREGEFLO® P100G, pre-gelatinized particles smaller than with PREGEFLO® L100G and brown in color are observed. As this last point was not in phase with a certain amylose content in the potato, two complementary images were made, corresponding to FIGS. 4 and 5.

FIG. 5: PREGEFLO® P100G in water alone without cooking.

FIG. 6: before cooking in the powdered tomato sauce.

These two pictures indicate the following hypothesis of a partial release of the contents of the starch granule in the system due to the acidity. PREGEFLO® P100G has in fact a granulometry close to that of PREGEFLO® L100F.

Particle size—Laser granulometry

Although the Dmode values are quite close between each type of starch, a difference in D90 and D (4; 3) diameters is observed with PREGEFLO® L100G where the diameters are the highest (FIG. 7).

Analyses carried out on the powders as such reveal that the particle size distribution is mainly monomodal (FIG. 8).

The distribution of PREGEFLO® L100G is the highest in diameter, which confirms the particle size distribution of the sauce based on this starch.

Visual aspect of the tomato sauce

The results are presented in FIGS. 9 to 12.

Of the 4 samples, only PREGEFLO® L100G is thicker and a pulpy state appears in the sauce.

PREGEFLO® L100F and P100G are close to the negative control that does not contain PREGEFLO®.

When studying the pulpiness of the sauce, it is from the least pulpy to the most pulpy (scores from 0 to 3):

PREGEFLO® L100G: 3

PREGEFLO® P100G: 1

PREGEFLO® L100F: 0

Viscosity analyses—RVA

The results are presented in FIG. 13.

The viscosity profiles of PREGEFLO® L100 G and L100 F are similar (independently of their particle size difference) and reflect a higher viscosity than PREGEFLO® P100G.

In conclusion, PREGEFLO® L100 G is to be preferred for the preparation of "instant" tomato sauce.

The invention claimed is:

1. A method of providing a pasty food composition with a pulpy character, comprising the step of providing a texturizing agent comprising an amylose-rich pre-gelatinized starch derived from peas having a large particle size, the amylose content of which is from 25% to 45% by weight relative to the total weight of starch, the particle size of which, determined according to the German standard DIN 66145:1976-04, is defined by an "n" value from 1.7 to 2 and a "d'" value from 850 to 1,000 µm, and the particle size distribution of which is monomodal;

wherein the amylose-rich pre-gelatinized starch derived from peas is in powder form; and wherein the amylose-rich pre-gelatinized starch derived from peas is obtained by hydrothermal gelatinization of native starches selected from steam cooking, jet-cooking, drum cooking and kneading cooking.

2. The method according to claim 1, wherein the amylose content of the starch is of the order of 35% by total weight of starch.

3. The method according to claim 1, wherein the particle size of the starch, determined according to the German standard DIN 66145:1976-04, has an "n" value of the order of 1.8, and a "d'" value of the order of 900 µm.

* * * * *